April 19, 1960 T. W. MILTON ET AL 2,933,019
REAR VIEW MIRRORS
Filed July 18, 1955 2 Sheets-Sheet 1

THOMAS W. MILTON
& ROBERT H. MILTON
BY INVENTORS.

*Alfred T. Milton*
ATTORNEY.

Thomas W. Milton
& Robert H. Milton
INVENTORS.

BY

ATTORNEY.

United States Patent Office 2,933,019
Patented Apr. 19, 1960

2,933,019

REAR VIEW MIRRORS

Thomas W. Milton and Robert H. Milton, Detroit, Mich.

Application July 18, 1955, Serial No. 522,671

2 Claims. (Cl. 88—93)

This invention relates to rear view mirrors for motor vehicles, and more particularly to remotely controlled rear view mirrors adapted to be secured to a motor vehicle exteriorly thereof, and to be controlled as to horizontal and vertical position by means of a remotely spaced control member. The control member may be positioned inside the vehicle in such a manner that the driver of the vehicle or a passenger therein can readily actuate the control to move the mirror to a position such that the driver or other occupant of the vehicle can readily observe road and traffic conditions behind the vehicle.

Rear view mirrors have been extensively used on motor vehicles to enable the driver to observe traffic conditions behind the vehicle. Due to difficulties in adjusting the position of the mirror so that the driver can readily observe a desired portion of the road behind the vehicle, such devices have not been used as extensively as they would be if a more readily operable means were provided for varying the position of the mirror to meet the needs of individual drivers.

We have found that these difficulties can be overcome by providing an improved remote control mechanism whereby the mirror positioned at any desired location on the outside of the vehicle such for example as on the front fenders or on the side panel or on the door can be readily adjusted by a conveniently located control knob positioned within easy reach of the driver or other occupant of the vehicle.

An object of this invention is therefore to provide a rear view mirror adapted to be mounted at any desired location on the outside of the vehicle and which can be adjusted angularly by a control mechanism located within the vehicle.

Another object of this invention is to provide a rear view mirror adapted to be mounted at any desired location on the vehicle to be controlled from within the vehicle by a manually operable control such for example as a flexible shaft.

Yet a still further object of the invention is to provide an improved position control mechanism for a rear view mirror having manually operable adjusting means for varying the angular relation of the mirror head with reference to its base by rotational movement of a threaded member to vary the angular position of the mirror in a horizontal plane, and to vary the position of the mirror in a vertical plane by axial movement of the threaded member.

Yet a further object of this invention is to provide a rear view mirror of improved design which can be manufactured economically, and which may be mounted on a vehicle in any desired location to enable the driver to have a greater degree of visibility of road and traffic conditions behind the vehicle than has heretofore been possible.

Another object of this invention resides in the provision of an improved and simplified scanning mechanism whereby through the operation of an irreversible motion transmitting mechanism the angular relation of the mirror in a horizontal plane can be readily varied by rotating the control member, and wherein the angular relation of the mirror in a vertical plane may be varied by continuing the rotation of the control member to scan the rear scene to the right and left in successively higher and higher or lower and lower horizontal planes to a desired location for example to accommodate drivers varying in stature.

Another object of this invention is to provide a rear view mirror supporting and adjusting mechanism which has sufficient stability that when moved to any adjusted position it will resist the forces exerted thereon by vibration, strong headwinds or the cleaning of the reflecting surface and thus remain in a desired adjusted position.

Still a further object of this invention is to provide an improved mirror adjusting mechanism whereby the mirror may readily be adjusted horizontally and vertically from within the car, thereby making it possible to mount the mirror well forward on the vehicle to enable the driver to have better view of traffic and road conditions behind the vehicle.

Yet a further object of my invention is to provide a rear view mirror control whereby a driver can readily adjust the mirror to prevent light from cars behind being reflected by the mirror into the eyes of the driver.

Other objects and advantages of this invention will be apparent from the following description, taken in conjunction with the attached drawings, submitted for purposes of illustration only and not intended to define the scope of the invention, reference being had for that purpose to the subjoined claims.

In the drawings, wherein similar characters refer to similar parts throughout the several views.

Before explaning in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
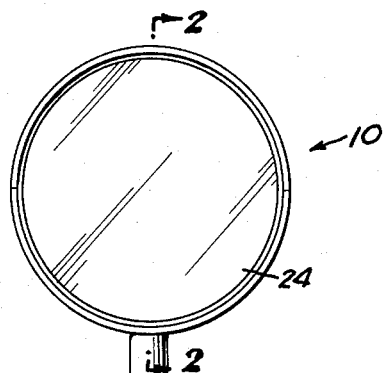
Fig. 1 is a part schematic elevational view illustrating my improved rear view mirror mounted on a vehicle.
Figure 1:
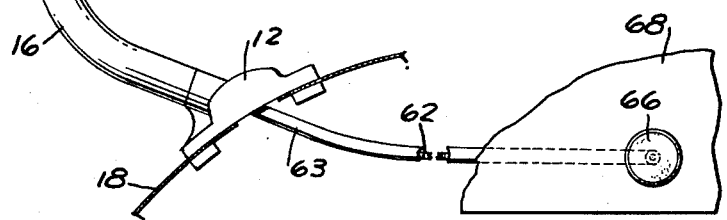
Figure 2:
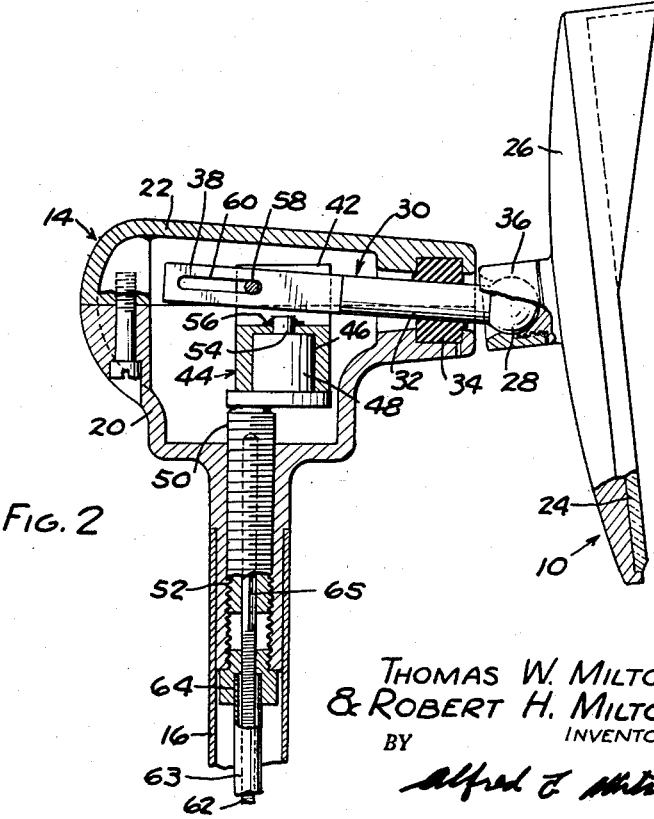
Fig. 2 is a sectional view illustrating the actuating mechanism employed to convert rotary movement of a shaft into a scanning action of the mirror whereby the angular relation of the mirror may be varied about vertical and horizontal axes.

Referring now more particularly to Fig. 1 it will be noted that a rear view mirror 10 has a base or supporting member 12 and a head assembly 14 (Fig. 2). The base and head assemblies 12 and 14 are interconnected by a suitable support 16 which, of course, may be of any desired shape or contour. Obviously the curvature of support 16 is to convert the somewhat horizontal surface 18 into a vertical plane. When the mirror or mirrors are mounted forward on the fenders the support 16 will be straight, or more nearly straight. Support 16 may be formed of a circular conduit or it may be of streamlined construction and may vary in shape from the base 12 to the head assembly 14 as for example by tapering down to provide a graceful shape to blend nicely with the streamlined features of modern vehicles.

The base 12 may be shaped in any desired manner to harmonize with modern styling trends and may be suitably contoured to align with a portion of the vehicle to which it is desired to attach the base 12, such for example as the front fenders of a vehicle. It will, of course, be apparent that if desired the base 12 may be secured to a side panel of the vehicle or to a door of the vehicle. My improved adjusting mechanism now to be described makes it possible for the driver or other occupant of the vehicle to readily adjust the position of the mirror angularly to any desired horizontal and vertical position. The need for locating the mirror head 14 within arms reach of the driver in order to enable him to adjust it in a desired position is thus effectively eliminated and by the use of my invention it becomes possible to mount the rear view mirrors at the most advantageous location on the vehicle from where the best view of traffic and road conditions behind the vehicle may be obtained.

The head assembly 14 has a casing 20 and a cover plate 22 cooperating to house the actuating mechanism for varying the angular position of the mirror 24 in horizontal and vertical planes so that the reflecting surface of the mirror 24 may be positioned in any desired angular relation to enable the driver of the vehicle to obtain the maximum view of traffic conditions behind the vehicle. The mirror 24 is carried by a suitable shell 26 preferably mounted on a ball connection 28 secured to a mirror carrying member 30. The sole function of the ball connection is to offset the difference in the angle of incidence where the mirror is mounted on the right fender as compared with similar mounting on the left fender so that the full range of the scanning mechanism will be retained for useful purposes. The rear portion of member 30 preferably has a circular section 32 projecting through a rubber grommet 34 preferably formed of molded rubber. This grommet is of such durometer as to provide sufficient yieldability for the universal movement of the mirror support 30 and to seal out moisture and seal in the lubricant.

It will be apparent that any desired means may be employed to secure the ball connection 28 in the mirror carrying member and that any convenient connecting mechanism such for example as a threaded member 36 embracing the ball connection 28 and threaded onto the shell 26 may be employed to secure the mirror carrying shell 26 to the mirror carrying member 30 positioned in the casing and cover plate 20 and 22 and projecting rearwardly therefrom.

Figure 3:
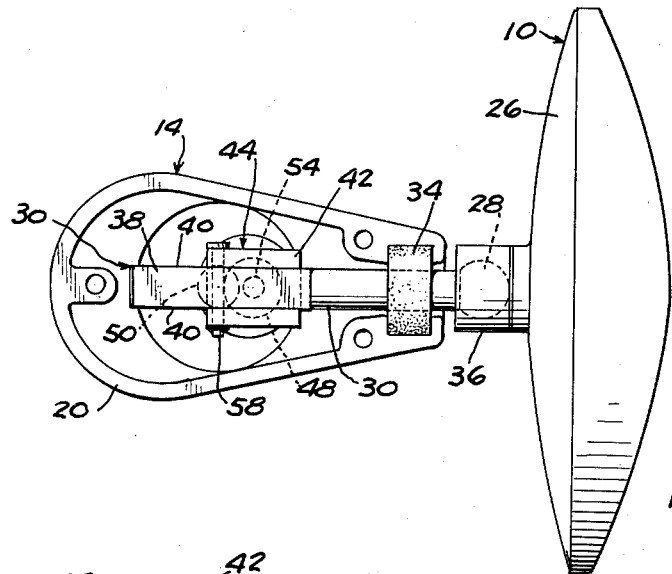
Fig. 3 is a plan view illustrating the mechanism disclosed in Fig. 2.
Figure 4:
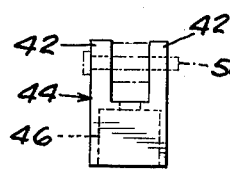
Fig. 4 is an elevational view of the motion transmitting control member.

The forward portion of the mirror carrying member 30 is contoured to provide parallel sides 40 (Fig. 3), adapted to be positioned between flanges 42 carried by a cap member 44 having a centrally disposed circular aperture 46 to receive a circular eccentric driving member 48 carried by a threaded member 50 threadedly mounted in screw threads 52 formed in the lower portion of the casing 20. The eccentric driving member 48 may be secured in the cap member 44 in any convenient manner to maintain the parts in assembled relation such for example as by means of a projection 54 extending through an aperture in the cap member 44 and engaged by a spring clip member 56 having fingers which engage and bite into the external surface of the projection 54 to maintain the members in assembled relation relative to each other.

Means are employed to secure the mirror carrying member 30 to the flanges 42 of the cap member 44. One desired illustrative connecting means consists of a pin 58 projecting through the flanges 42 of the cap member 44 and through an elongated slot 60 formed in the forward portion 38 of the mirror carrying member 30.

Any suitable means may be employed to rotate the threaded member 50 in the screw threads 52 of the casing 20 from a remote point. One illustrative example of suitable motion transmitting means consists of a flexible shaft 52 which has been deformed to a non-round section as at 65 and which is inserted in a matching cavity in threaded member 50, thus transmitting the rotation of shaft 62 to the threaded member 50. The flexible shaft 62 is housed within a flexible conduit 63 anchored in a bushing 64 which is screwed into member 52. As illustrated in Fig. 1 the flexible shaft 62 projects through the casing 16 and the base 12 and extends to a convenient location within the vehicle where it connects with a suitable control member, such for example as a knob 66 positioned for example on the instrument panel 68 of the vehicle where the operator can readily grasp the knob 66 to vary the angular adjustment of the mirror 24.

The operation of adjusting the angular relation of the mirror is as follows: To adjust the mirror 24 in the horizontal plane only, the operator grasps the knob 66 and oscillates it one way or the other to rotate the flexible shaft 62 and with it the threaded member 50 in the screw threads 52 of the casing 20. Rotation of the threaded member 50 oscillates the eccentric driving member 48 which is secured to or is an integral part of the threaded member. Oscillating movement of the eccentric driving member 48 operates through the cap member 44 to impart to the mirror carrying member 30 an angular movement about the rubber grommet or bushing 34. It will be apparent that the eccentric driving member 48 rotates within the centrally disposed circular aperture 46 formed in the cap member as the threaded member 50 rotates within the screw threads 52 of the casing 20, and the forward portion 38 of the mirror carrying member 30 is moved from side to side horizontally by the rotational movement of the cap member 44, the forward portion 38 of the mirror carrying member 30 remaining in a substantially fixed position fore and aft in the casing 20 and cap 22 and the flanges 42 of the cap member 44 move longitudinally of the forward portion 38 of the mirror carrying member 30. This movement is permitted by reason of the connection of the pin 58 secured in the flanges 42 of the cap member 44 and sliding longitudinally of the mirror carrying member 30 in the slot 60 formed in the forward portion thereof. It will thus be apparent that as the knob 66 is rotated one way or the other the mirror 24 is moved angularly to vary its position in a horizontal plane.

Figure 5:
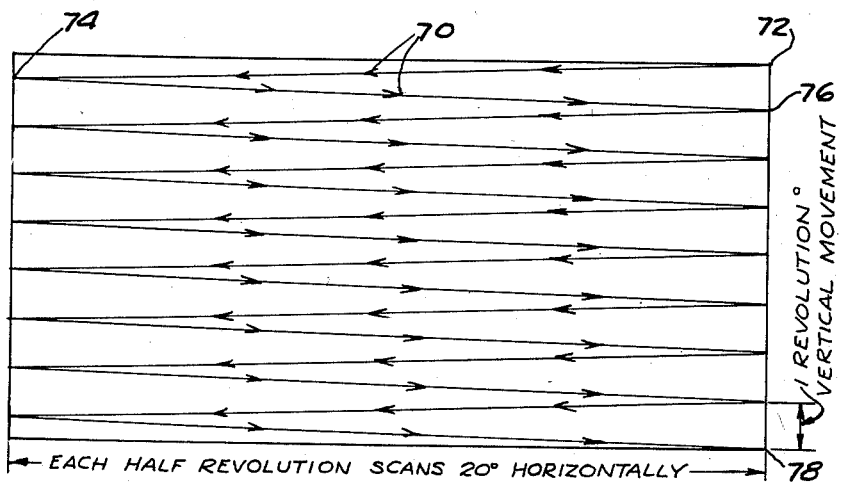
Fig. 5 is a diagrammatic view illustrating the operation of the scanning mechanism whereby the mirror head is oscillated horizontally in a series of closely spaced substantially horizontal planes to seek a desired angular relation vertically of the mirror.

To vary the position of the mirror 24 in the vertical plane the continuing rotation of knob 66 in the same direction causes the threaded member 50 to move axially in the screw threads 52 of the casing 20. Axial movement of the threaded member functions to raise or lower the cap member 44 in the casing 20 and through the connection between the flanges 42 of the cap member 44 and the mirror carrying member 30, namely the pin 58 sliding in the slot 60 the forward portion 38 of the mirror carrying member 30 is elevated or lowered relative to the rubber grommet or bushing 34 whereupon the vertical position of the mirror 24 is varied. This action is illustrated schematically or diagrammatically in Fig. 5 wherein the series of arrows 70 illustrate the action of adjusting the mirror from a point 72 to a point 74, it being noted that as the control member 66 and the threaded member 50 are rotated one half revolution the horizontal position of the mirror has scanned or moved through a 20° arc in the example illustrated. As the control member 66 is continued to be rotated in the same direction after the point 74 is reached, the horizontal position of the mirror is returned to the zero point where it was at point 72 but the vertical position of the mirror is shifted downwardly as illustrated. In the example illustrated 8 revolutions of the control member 66 will move the mirror 24 through 10 degrees of vertical movement. It will, of course, be apparent that any desired rate of variation of the angular adjustment vertically can be effected by varying the lead of the threaded member 50 in the screw threads 52, coarser threads at this point effecting a greater movement of the mirror 24 vertically as the control knob 66 is rotated, and conversely a finer thread reducing the degree of movement of the mirror carrying member 30 angularly within the bushing 34 to effect a lesser degree of movement of the mirror 24 vertically as the control knob is actuated.

It will be understood that any desired mechanism for converting the rotational movement of the control member or threaded member 50 into movement of the mirror carrying member 30 may be employed. While we have shown a cap member 44 having a central bore to receive the eccentric member 48 it will be apparent that other control mechanisms may be employed. For example, the threaded member 50 may be formed with an eccentric crank to which the mirror carrying member 30 may be connected through a telescoping or sliding connection to effect the desired horizontal and vertical adjustment of the mirror 24 by rotation of the threaded member 50, or a ball joint may be mounted eccentrically to threaded member 50. Many varieties of linkage are possible.

The essence of our invention resides in the provision of a control knob or member located within easy reach of the driver of the vehicle, the control member being interconnected through a flexible drive or other suitable driving mechanism to convert a rotary movement of the control knob into side to side movement of the mirror to effect desired adjustments in the horizontal plane, and continuous rotation of the control knob 66 effecting an axial shifting of the threaded member in the casing to adjust the vertical position of the mirror as the control knob is actuated to successively move the mirror back and forth horizontally and to progressively move it vertically as the rotation of the control knob continues. Any linkage or combination of motion transmitting mechanisms whereby continuing rotation of a control knob or member effects variation in the angular positions, horizontally and vertically of a rear view mirror is clearly within the scope of our invention.

While our invention has been illustrated as particularly applied to a rear view mirror for motor vehicles it will be apparent that it is also applicable to other devices, the position of which it is desired to control in two planes. It will be apparent that the connection between the ball connector 28 and the threaded member 36 is adjusted to position the mirror 24 at a desired approximate setting. When the mirror assembly has been mounted on a vehicle the procedure is as follows: The control knob is rotated to approximately the mid point between the high and low limits and to the extreme point horizontally as at 72 which will reflect the maximum amount of the vehicle when viewed from the driver's seat. Then the nut 36 is loosened and the mirror is moved by hand upon the ball joint so that the reflected rear view is directly rearward along the side of the vehicle and at the desired vertical position. The nut is then set up tightly to lock this position permanently. Thus the full scanning action of the mechanism will operate in the area of interest.

While the invention has been illustrated with the mirror carrying member 30 and the threaded member 50 disposed at approximately a 90° angle relative to each other, it will be apparent that this angular relation may be varied between relatively wide limits, such for example as 45° to either side without department from the spirit of our invention.

We claim:

1. A rear view mirror for a motor vehicle comprising a base adapted to be secured to a motor vehicle, a head assembly carried by the base and including a casing having internal threads and a pair of angularly related apertures, a mirror carrying member journalled for universal movement adjacent one of said apertures, a mirror secured in said carrying member, a threaded control member journalled in the internal threads of the casing and having an eccentric driving portion for rotational movement in the other of said apertures, eccentric connecting means aligned with the threaded member and operably connected to the mirror carrying member comprising a cap having an aperture to receive the eccentric driving portion of the threaded member whereby rotational movement of the threaded member varies the angular position of the mirror in a horizontal plane and axial movement of the threaded member in the internal threads of the casing varies the angular position of the mirror in a vertical plane, spaced guiding flanges carried by the cap to slidably receive the mirror carrying member, connecting means between the cap and the mirror carrying member, a manually operable member positioned in the vehicle, and flexible driving means between the manually operable member and the threaded member to adjust the horizontal and vertical position of the mirror.

2. The invention defined in claim 1 wherein a pin projecting through the flanges of the cap is slidably mounted in a slot in the mirror carrying member.

References Cited in the file of this patent

UNITED STATES PATENTS

| | | |
|---|---|---|
| 1,491,937 | Walker | Apr. 29, 1924 |
| 2,281,234 | Clark et al. | Apr. 28, 1942 |
| 2,614,437 | Meggitt | Oct. 21, 1952 |
| 2,674,922 | Robinson | Apr. 13, 1954 |
| 2,717,531 | Schenck | Sept. 13, 1955 |